United States Patent
Choi

(10) Patent No.: US 9,553,962 B2
(45) Date of Patent: Jan. 24, 2017

(54) WINDOW MEMBER AND DISPLAY APPARATUS HAVING THE SAME

(71) Applicant: Jong Hyun Choi, Yongin (KR)

(72) Inventor: Jong Hyun Choi, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 355 days.

(21) Appl. No.: 13/942,929

(22) Filed: Jul. 16, 2013

(65) Prior Publication Data
US 2014/0240926 A1    Aug. 28, 2014

(30) Foreign Application Priority Data

Feb. 26, 2013    (KR) .................. 10-2013-0020692

(51) Int. Cl.
*H05K 7/20*        (2006.01)
*H04M 1/02*        (2006.01)
*G06F 1/20*        (2006.01)
*G06F 1/16*        (2006.01)

(52) U.S. Cl.
CPC .......... *H04M 1/0266* (2013.01); *G06F 1/1637* (2013.01); *G06F 1/203* (2013.01); *G06F 1/1626* (2013.01)

(58) Field of Classification Search
CPC .................. H05K 7/20; G06F 1/203
USPC ......................................... 361/707; 382/115
See application file for complete search history.

(56) References Cited

U.S. PATENT DOCUMENTS

| | | | |
|---|---|---|---|
| 2003/0155860 A1* | 8/2003 | Choi ................... | H01L 51/5284 313/498 |
| 2010/0053512 A1* | 3/2010 | Taniguchi et al. ............ | 349/106 |
| 2010/0085713 A1* | 4/2010 | Balandin et al. ............. | 361/705 |
| 2012/0105340 A1 | 5/2012 | Beom et al. | |
| 2014/0169033 A1* | 6/2014 | Yu ...................... | H05K 7/20409 362/611 |
| 2016/0066440 A1* | 3/2016 | Choi ..................... | G06F 1/1637 361/679.3 |

FOREIGN PATENT DOCUMENTS

| | | | | |
|---|---|---|---|---|
| KR | 10-2012-0044501 A | 5/2012 | | |
| KR | 10-2012-0094380 A | 8/2012 | | |
| KR | 1020110013855 A | * 8/2012 | ............... | C09J 7/02 |
| KR | 10-2012-0120098 A | 11/2012 | | |

* cited by examiner

*Primary Examiner* — Dion R Ferguson
*Assistant Examiner* — Mandeep S Buttar
(74) *Attorney, Agent, or Firm* — Lee & Morse P.C.

(57) ABSTRACT

A window member includes a base substrate that includes a display area transmitting a light and a non-display area disposed adjacent to the display area, a color pattern disposed on a surface of the base substrate in the non-display area, and a heat-discharge member that covers the color pattern and absorbs a heat to discharge the heat to an outside.

14 Claims, 8 Drawing Sheets

WINDOW MEMBER AND DISPLAY APPARATUS HAVING THE SAME

CROSS-REFERENCE TO RELATED APPLICATION

This application claims the benefit of and priority under 35 U.S.C. §119 to Korean Patent Application No. 10-2013-0020692, filed on Feb. 26, 2013, in the Korean Intellectual Property Office, and entitled: "WINDOW MEMBER AND DISPLAY APPARATUS HAVING THE SAME," which is incorporated by reference herein in its entirety.

BACKGROUND

1. Field

Embodiments relate to a window member and a display apparatus having the same.

2. Description of the Related Art

As the information society has developed rapidly, various display panels, e.g., an organic light emitting display panel, a liquid crystal display panel, an electrowetting display panel, etc., have been developed.

SUMMARY

Embodiments are directed to a window member, including a base substrate that includes a display area transmitting a light and a non-display area disposed adjacent to the display area, a color pattern disposed on a surface of the base substrate in the non-display area, and a heat-discharge member that covers the color pattern and absorbs a heat to discharge the heat to an outside.

The heat-discharge member may include a carbon material.

The heat-discharge member may include a graphene material and may be extended in the display area.

The heat-discharge member may include a graphite material or a graphene material and may be disposed on the color pattern.

The window member may further include a first protective layer disposed between the color pattern and the heat-discharge member.

The window member may further include a second protective layer disposed on the heat-discharge member.

The base substrate may include a concave portion disposed in the non-display area, and the color pattern may be disposed in the concave portion.

Embodiments are also directed to a display apparatus, including a display panel for displaying an image, a window member disposed in a direction in which a light exiting from the display panel travels, and an adhesive layer disposed between the display panel and the window member, the window member including a base substrate that includes a display area transmitting a light and a non-display area disposed adjacent to the display area, a color pattern disposed on a surface of the base substrate in the non-display area to face the display panel, and a heat-discharge member that covers the color pattern and absorbs a heat to discharge the heat to an outside.

The heat-discharge member may include a carbon material.

The heat-discharge member may include a graphene material and may be extended in the display area.

The heat-discharge member may include a graphite material or a graphene material and may be disposed on the color pattern.

The display apparatus may further include a first protective layer disposed between the color pattern and the heat-discharge member.

The display apparatus may further include a second protective layer disposed on the heat-discharge member.

The base substrate may include a concave portion disposed in the non-display area, and the color pattern may be disposed in the concave portion.

BRIEF DESCRIPTION OF THE DRAWINGS

The above and other advantages of embodiments will become readily apparent by reference to the following detailed description when considered in conjunction with the accompanying drawings wherein.

DETAILED DESCRIPTION

Figure 1:
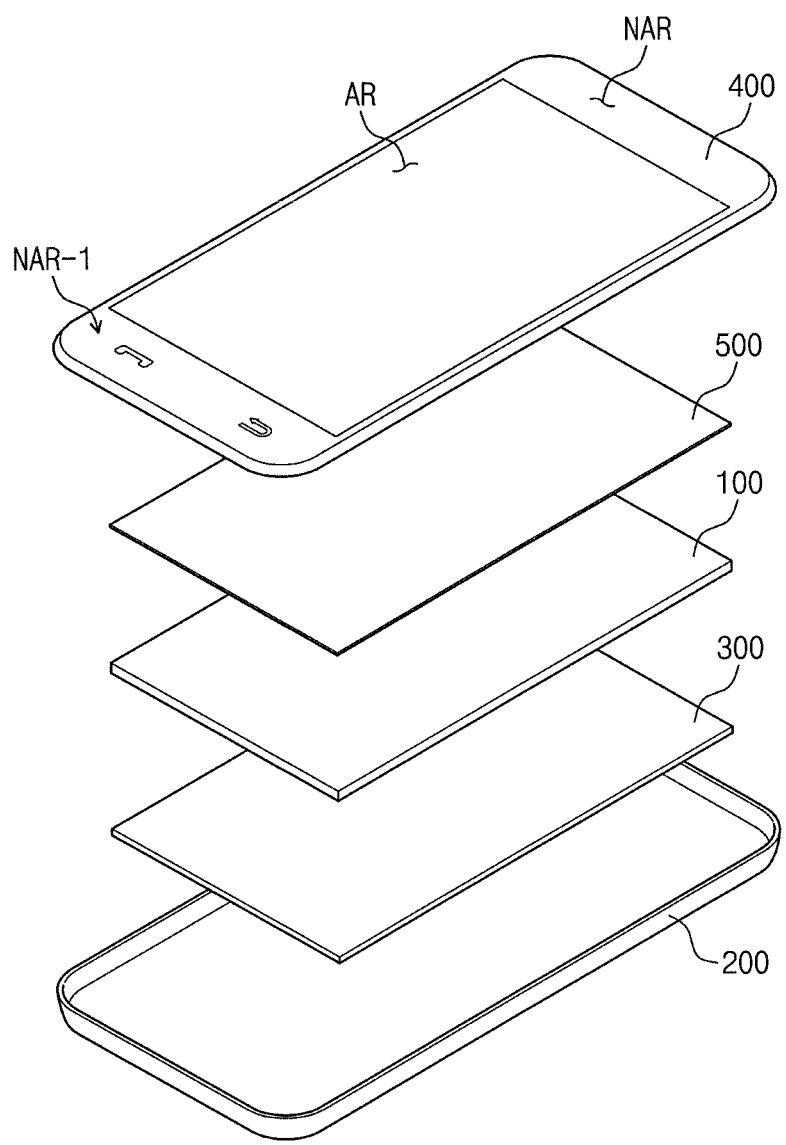
FIG. 1 is an exploded perspective view showing a display apparatus according to an example embodiment.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, a first element, component, region, layer, or section discussed below could be termed a second element, component, region, layer, or section without departing from the teachings of the disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 2:
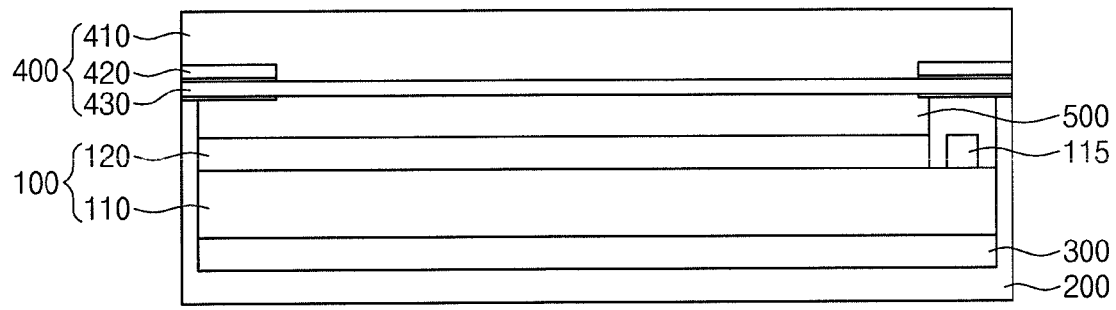
FIG. 2 is a cross-sectional view showing the display apparatus shown in FIG. 1.

FIG. 1 is an exploded perspective view showing a display apparatus according to an example embodiment and FIG. 2 is a cross-sectional view showing the display apparatus shown in FIG. 1.

Referring to FIGS. 1 and 2, the display apparatus includes a display panel 100, a housing 200 that accommodates the display panel 100 therein, a shock absorbing sheet 300 disposed between the display panel 100 and the housing 200, a window member 400 disposed on the display panel 100, and an adhesive layer 500 disposed between the display panel 100 and the window member 400.

The display panel 100 displays an image. The display panel 100 may be a self-emissive display panel, such as an organic light emitting display panel, but it should not be limited thereto or thereby. That is, the display panel 100 may be a non-self emissive display panel, such as a liquid crystal display panel, an electrophoretic display panel, an electrowetting display panel, etc. When the non-self emissive display panel is used as the display panel 100, the display apparatus includes a backlight unit to supply light to the display panel 100. In the present example embodiment, the organic light emitting display panel will be described as the display panel 100.

The display panel 100 includes a display substrate 110 and a sealing substrate 120.

The display substrate 110 includes a thin film transistor substrate (not shown) including at least one thin film transistor disposed on an insulating substrate and an organic light emitting device connected to the thin film transistor. The display substrate 110 includes a driver 115 disposed adjacent to a side of the thin film transistor substrate to drive the organic light emitting device. In the present example embodiment, the driver 115 may be a chip-on-glass (COG) type driving device.

The organic light emitting device is disposed on the thin film transistor substrate. The organic light emitting device includes a first electrode connected to the thin film transistor, an organic layer disposed on the first electrode, and a second electrode disposed on the organic layer. One of the first electrode and the second electrode is an anode electrode, and the other one of the first electrode and the second electrode is a cathode electrode. Further, at least one of the first electrode and the second electrode may be transparent.

For instance, the first electrode may be a conductive layer containing a transparent conductive oxide material, e.g., indium tin oxide (ITO), indium zinc oxide (IZO), aluminum zinc oxide (AZO), gallium-doped zinc oxide (GZO), zinc tin oxide (ZTO), gallium tin oxide (GTO), or fluorine-doped tin oxide (FTO). The second electrode includes a material having a work function lower than that of the first electrode. For instance, the second electrode includes at least one of Mo, MoW, Cr, Al, AlNd, and Al alloy.

The organic layer includes at least an emitting layer (EML) and may have a multi-layer structure. For instance, the organic layer includes a hole injection layer (HIL) that injects holes, a hole transport layer (HTL) that transports holes and/or controls electrons, which are to be combined with the holes in the light emitting layer EML, to enhance combination opportunities between the holes and the electrons, the light emitting layer EML that emits the light using recombination of the holes and the electrons, a hole blocking layer (HBL) that controls movement of the holes not combined with the electrons, an electron transport layer (ETL) that transports the electrons to the light emitting layer EML, and an electron injection layer (EIL) that injects the electrons.

The emitting layer of the organic layer includes a high molecular weight organic material. The emitting layer may include one of poly(phenylene vinylene) (PPV), soluble poly(phenylene vinylene) (PPV), cyano-substituted poly (phenylene vinylene) (CN-PPV), or polyfluorene (PFO). The emitting layer may be a stack type or a tandem type. The stack type emitting layer is configured to include red, green, and blue sub-emitting layers, and a stack order of the red, green, and blue sub-emitting layers should not be limited to a specific order. In the stack type emitting layer and the tandem type emitting layer, all of the red, green, and blue sub-emitting layers is a fluorescent emitting layer or at least one sub-emitting layer is a phosphorescence emitting layer. Further, emitting layers disposed at both sides of a charge generation layer of the tandem type emitting layer emit a white color light, a different color light, or a same color light, and the color light is a monochromatic or polychromatic light.

The sealing substrate 120 isolates the organic light emitting diode from the external environment and is coupled to the display substrate 110 using a sealant. In the present example embodiment, the sealing substrate 120 may be a transparent insulating substrate.

A polarizing member (not shown) is attached to a surface of the display panel 100, which faces the window member 400, to help prevent the quality of the image displayed in the display panel 100 from being degraded due to the reflection of light from the external (hereinafter, referred to as external light). In detail, the polarizing member includes a polarizing film having a polarizing axis in a specific direction and a retardation film having a phase difference of $\lambda/4$. The polarizing member circularly polarizes the external light to help prevent the quality of the image displayed in the display panel 100 from being degraded due to the reflection of external light.

The housing 200 accommodates the display panel 100 therein. In FIG. 1, the housing is configured to include a single member that is integrally formed as a single unitary and individual unit to provide a space in which the display panel 100 is accommodated, but the number of the members for the housing should not be limited thereto or thereby. In the present example embodiment, the housing 200 configured to include the single member will be described in detail.

The housing 200 further accommodates a printed circuit board (not shown) on which a driving circuit chip is mounted. Further, the housing further accommodates a power supply part (not shown), e.g., a battery, according to a kind of the display device.

The shock absorbing sheet 300 is disposed between the display panel 100 and the housing 200 to absorb external shocks applied to the display panel 100. Accordingly, the shock absorbing sheet 300 helps to prevent the external shocks from being directly applied to the display panel 100.

The shock absorbing sheet 300 includes a shock absorbing film (not shown) that absorbs the external shocks and an adhesive (not shown) coated on at least one surface of both surfaces of the shock absorbing film. For instance, the adhesive is coated on the surface of the shock absorbing film, and thus the shock absorbing sheet 300 is attached to the display panel 100 or the housing 200 by the adhesive. The shock absorbing film may include a rubber-foam and have a thickness of about 300 micrometers.

The window member 400 is disposed in a direction to which the light used to display the image on the display panel 100 travels, and is coupled to the housing 200 to form an outer shape of the display device.

The window member 400 includes a display area AR through which the light generated by the display panel 100 is transmitted and a non-display area NAR disposed adjacent to at least a portion of the display area AR. The light does not transmit through the non-display area NAR. In an implementation, at least a portion of the non-display area NAR may be used as an input icon area NAR-I. The input icon area NAR-I is activated when the display apparatus is operated in a specific mode.

In the present example embodiment, the window member 400 includes a base substrate 410, a color pattern 420, and a heat-discharge member 430. The heat-discharge member 430 absorbs the heat generated from the display panel 100 and the driver 115 to discharge the heat to the outside of the display apparatus.

In the present example embodiment, although the driver 115 does not make contact with the heat-discharge member 430, the heat-discharge member 430 may absorb the heat generated from the driver 115 and discharge the heat to the outside of the display apparatus.

The adhesive layer 500 couples the display panel 100 and the window member 400. The adhesive layer 500 may be transparent to help prevent brightness of the image displayed in the display panel 100 from being reduced. For instance, the adhesive layer 500 may include a transparent polymer resin with viscosity, which is cured by the application of heat and pressure.

In the present example embodiment, the window member 400 included in the display apparatus includes the heat-discharge member 430, and thus the heat generated from the display panel 100 may be effectively discharged to the outside of the display panel 100. The window member absorbs the heat generated by the driver 115 and discharges the heat generated by the driver 115 to the outside of the display panel 100.

Thus, the display apparatus may help prevent the display panel 100 from malfunctioning.

Figure 3:
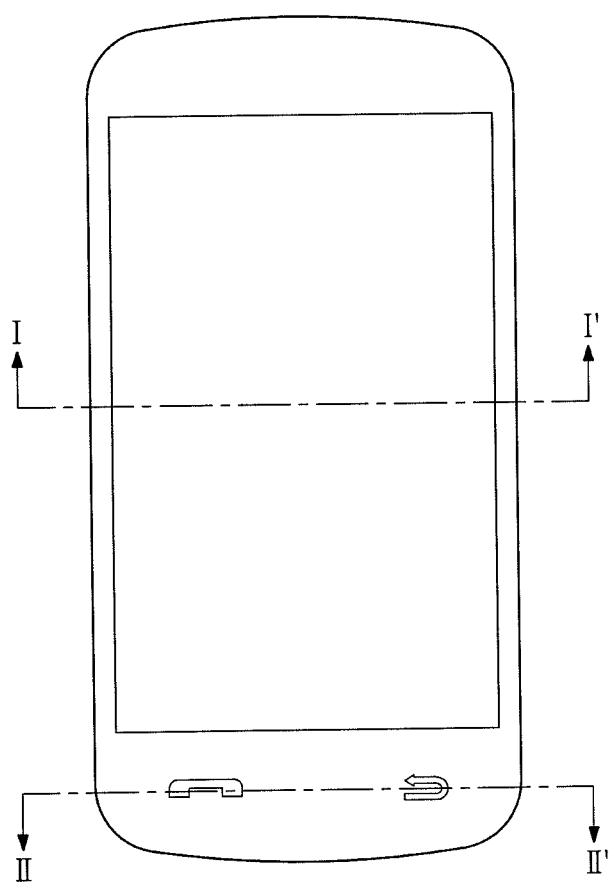
FIG. 3 is a plan view showing a window member shown in FIG. 1.
Figure 4:
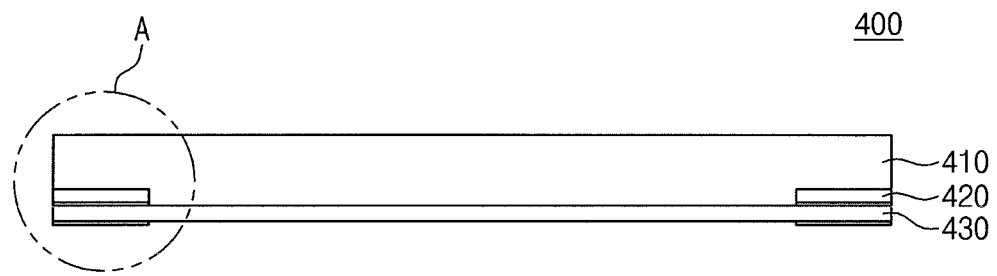
FIG. 4 is a cross-sectional view taken along a line I-I' of FIG. 3.
Figure 5:
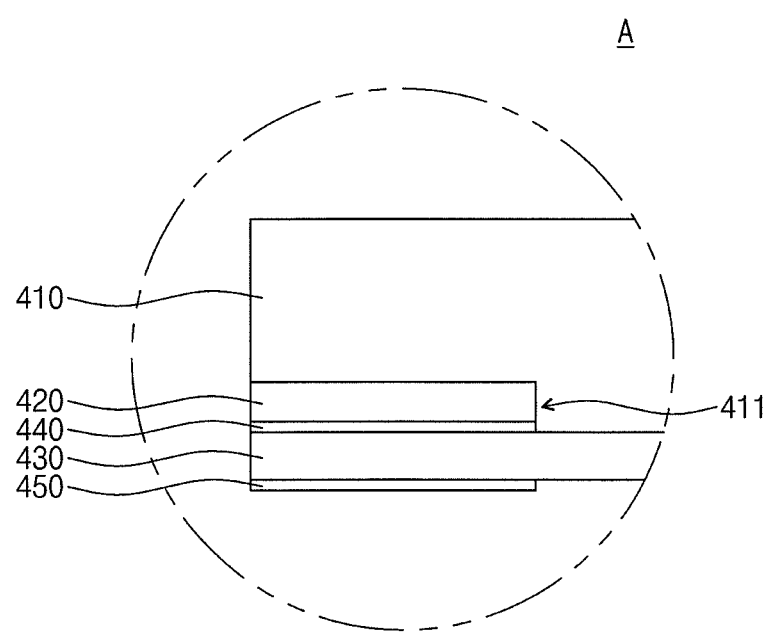
FIG. 5 is an enlarged view showing a portion A of FIG. 4.
Figure 6:
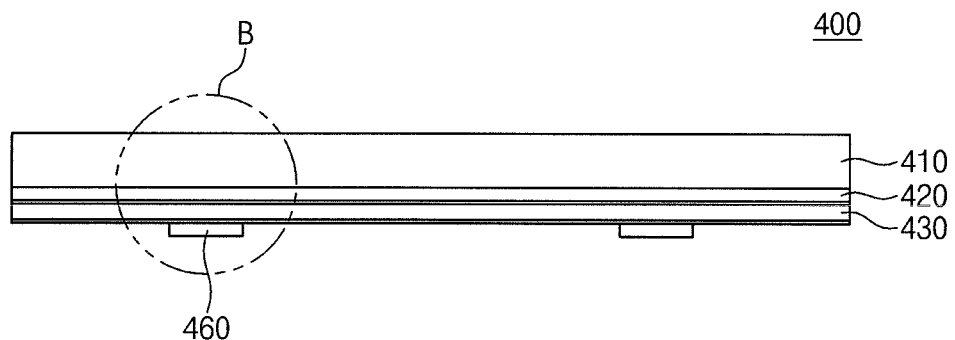
FIG. 6 is a cross-sectional view taken along a line II-II' of FIG. 3.
Figure 7:
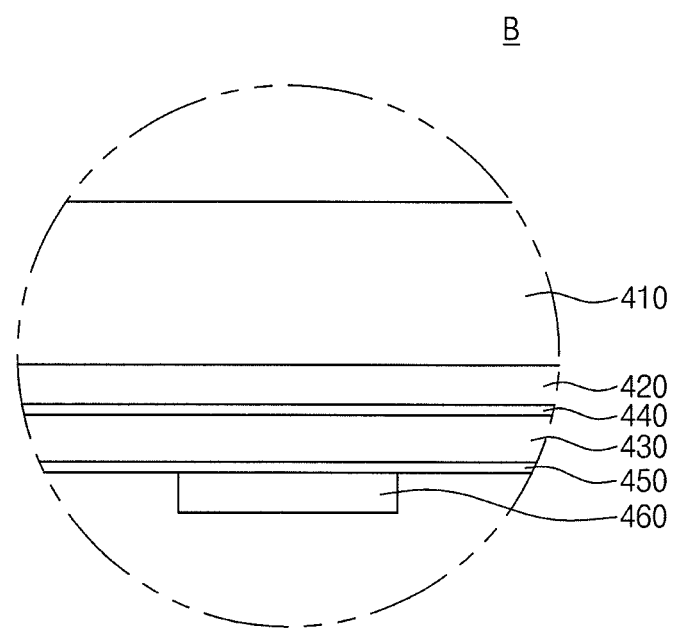
FIG. 7 is an enlarged view showing a portion B of FIG. 6.

FIG. 3 is a plan view showing the window member shown in FIG. 1, FIG. 4 is a cross-sectional view taken along a line I-I' of FIG. 3, FIG. 5 is an enlarged view showing a portion A of FIG. 4, FIG. 6 is a cross-sectional view taken along a line II-II' of FIG. 3, and FIG. 7 is an enlarged view showing a portion B of FIG. 6.

Referring to FIGS. 3 to 7, the window member 400 includes the base substrate 410, the color pattern 420, and the heat-discharge member 430.

The base substrate 410 has a rectangular shape in which a corner portion thereof is rounded. The base substrate 410 includes a first surface and a second surface. The first surface faces the display panel 100 and the second surface is a surface exposed to the outside. The base substrate 410 may be a high strength transparent plastic substrate or a high strength transparent glass substrate.

The base substrate 410 includes the display area AR transmitting the light therethrough and the non-display area NAR disposed adjacent to at least the portion of the display area AR. In an implementation, at least the portion of the non-display area NAR may be used as an input icon area NAR-I. Thus, the image generated in the display panel 100 passes through the display area AR.

In the present example embodiment, a concave portion 411 is provided in the base substrate 410 in the non-display area NAR to accommodate the color pattern 420, which is formed by recessing the first surface of the base substrate 410. The color pattern 420 is disposed on the first surface of the non-display area NAR. In detail, the color pattern 420 is accommodated in the concave portion 411.

The color pattern 420 may have various colors, e.g., a black color or a white color. For instance, when the color pattern 420 has the black color, the color pattern 420 includes a general black matrix material. In detail, the color pattern 420 may include a non-transparent inorganic insulating material, e.g., CrOx, MoOx, etc. Further, the color pattern 420 may include a non-transparent organic insulating material, e.g., a white resin, a black resin, etc.

The heat-discharge member 430 covers the first surface of the base substrate 410 and the surface of the color pattern 420. Thus, in the present example embodiment, the heat-discharge member 430 is extended not only to the non-display area NAR but also the display area AR. As will be apparent to one of ordinary skill in the art from this description and drawings, the heat-discharge member 430 may be transparent to help prevent brightness of the image displayed in the display panel 100 from being reduced.

In the present example embodiment, the heat-discharge member 430 includes a carbon material. For instance, the heat-discharge member 430 may include a graphene material that has a heat conductivity and transmits the light. The graphene material has the heat conductivity of about 4800 W/m·k to about 5300 W/m·k. Thus, the heat-discharge member 430 may absorb the heat around thereof and discharge the heat to the outside of the display panel 100.

The graphene material has superior electrical conductivity, and thus the graphene material may help prevent static electricity from occurring in the window member 400.

In the present example embodiment, a first protective layer 440 is disposed between the color pattern 420 and the heat-discharge member 430. The first protective layer 440 helps to prevent the color pattern 420 and the heat-discharge member 430 from being deformed. In an implementation, the first protective layer 440 may include an inorganic insulating material that transmits the light, e.g., silicon oxide SiOx, SiNx, etc.

Further, a second protective layer 450 is disposed on the heat-discharge member 430. The second protective layer 450 helps to prevent the heat-discharge member 430, which is exposed to the outside, from being deformed and damaged. The second protective layer 450 may include the same material as the first protective layer 440. In the present example embodiment, the second protective layer 450 is limited to be disposed only in the non-display area NAR.

In the input icon area NAR-I, an icon display pattern 460 may be disposed on the second protective layer 450. When the light is supplied from a separate light source, the icon display pattern 460 displays an icon on the second surface, which is the same as the icon display pattern 460. Accordingly, a user may perceive the icon.

As described above, the window member 400 included in the display apparatus includes the heat-discharge member 430, and thus the heat generated from the display panel 100 may be effectively discharged to the outside of the display panel 100. The window member 400 absorbs the heat generated by the driver 115 and discharges the heat generated by the driver 115 to the outside of the display panel 100. Thus, the display apparatus may help prevent the display panel 100 from malfunctioning.

Hereinafter, a display apparatus according to another example embodiment will be described with reference to FIGS. 8 to 12.

Figure 8:
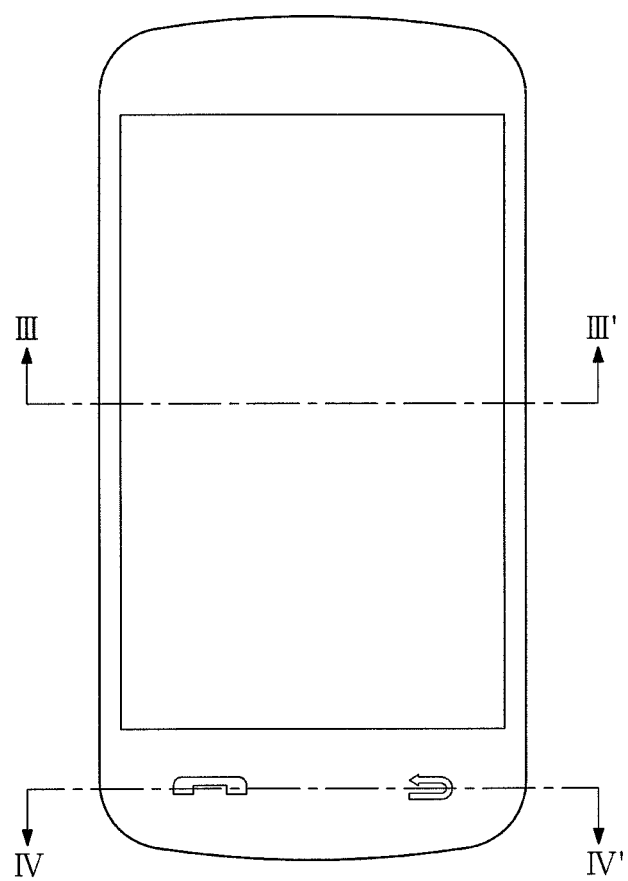
FIG. 8 is a plan view showing a window member of a display apparatus according to another example embodiment.
Figure 9:
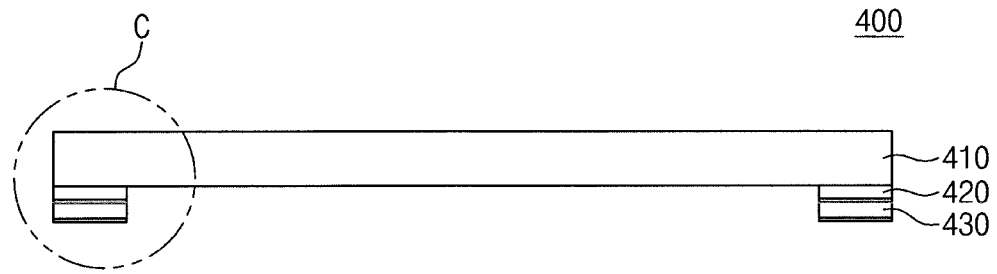
FIG. 9 is a cross-sectional view taken along a line I-I' of FIG. 8.
Figure 10:
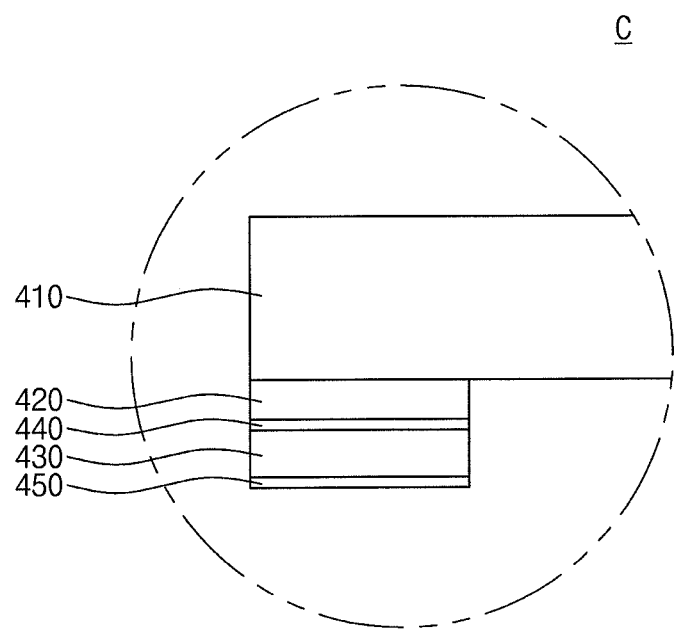
FIG. 10 is an enlarged view showing a portion C of FIG. 9.
Figure 11:
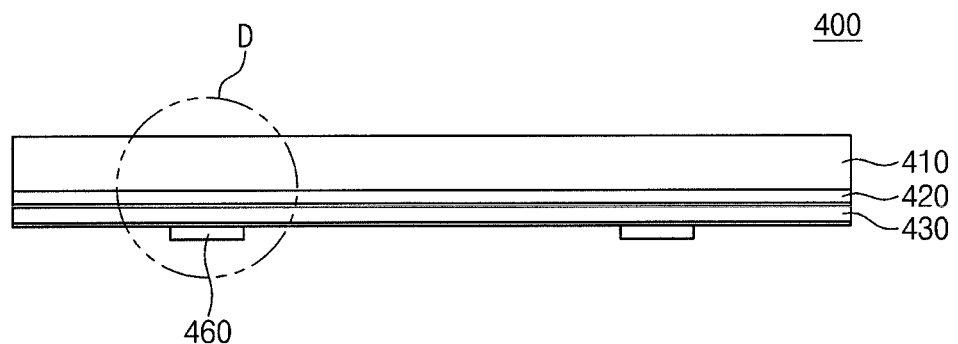
FIG. 11 is a cross-sectional view taken along a line II-II' of FIG. 8.
Figure 12:
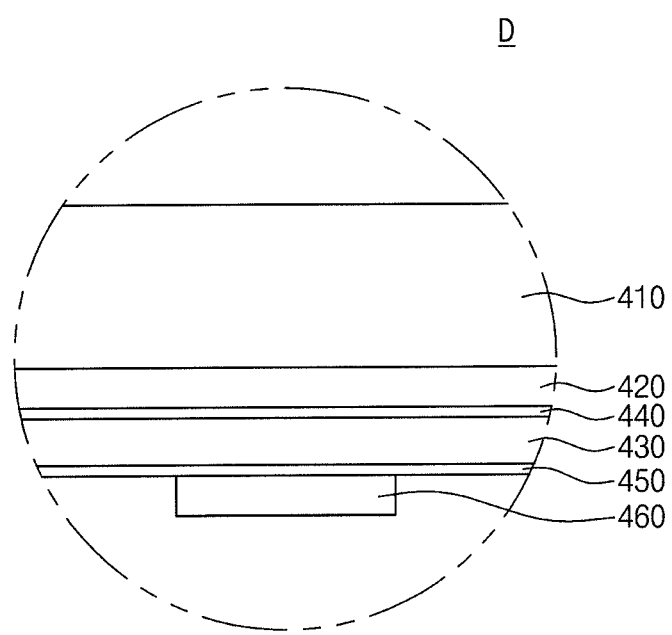
FIG. 12 is an enlarged view showing a portion D of FIG. 11.

FIG. 8 is a plan view showing a window member of a display apparatus according to another example embodiment, FIG. 9 is a cross-sectional view taken along a line I-I' of FIG. 8, FIG. 10 is an enlarged view showing a portion C of FIG. 9, FIG. 11 is a cross-sectional view taken along a line II-II' of FIG. 8, and FIG. 12 is an enlarged view showing a portion D of FIG. 11. In FIGS. 8 to 12, the same reference numerals denote the same elements in FIGS. 1 to 7, and thus detailed descriptions of the same elements will be omitted.

Referring to FIGS. 8 to 12, the window member 400 includes the base substrate 410, the color pattern 420, and the heat-discharge member 430.

The base substrate 410 includes the display area AR transmitting the light therethrough and the non-display area NAR disposed adjacent to at least the portion of the display area AR. Thus, the image generated in the display panel 100 passes through the display area AR.

The color pattern 420 is disposed on the first surface of the non-display area NAR. The color pattern 420 includes a material that blocks the light.

The heat-discharge member 430 is disposed on the color pattern 420. In the present example embodiment, the heat-discharge member 430 is disposed only in the non-display area NAR and is not disposed in the display area AR. In the present example embodiment, the heat-discharge member 430 may help to prevent the adhesive layer from being overflowed.

The heat-discharge member 430 has a heat conductivity. In the present example embodiment, the heat-discharge member 430 includes a graphite or graphene material. The graphite material has the heat conductivity of about 650 W/m·k to about 1800 W/m·k. The graphite material and the graphene material may have a heat conductivity higher than that of a general metal material. Thus, the heat-discharge member 430 may absorb the heat around thereof and discharge the heat to the outside of the display panel.

The graphite and the graphene have superior electrical conductivity, and thus the graphite and the graphene material help prevent static electricity from occurring in the window member 400.

The first protective layer 440 is disposed between the color pattern 420 and the heat-discharge member 430. The first protective layer 440 helps to prevent the color pattern 420 and the heat-discharge member 430 from being deformed. In an implementation, the first protective layer 440 may include an inorganic insulating material that transmits the light, e.g., silicon oxide SiOx, SiNx, etc.

In addition, the second protective layer 450 is disposed on the heat-discharge member 430. The second protective layer 450 helps to prevent the heat-discharge member 430, which is exposed to the outside, from being deformed and damaged. The second protective layer 450 may include the same material as the first protective layer 440. In the present example embodiment, the second protective layer 450 is limited to be disposed only in the non-display area NAR.

By way of summation and review, a display apparatus may include a display panel, a housing accommodating the display panel therein, and a window protecting an exposed surface of the display panel. The display apparatus may include a driver to drive the display panel. The driver may be accommodated in the housing. The housing may determines an outer shape of the display apparatus. Heat generated from the driver in the housing may not be easily discharged to the outside of the display apparatus. For example, in a display apparatus to which a chip-on-glass type driver is applied, the heat generated from the driver may cause a malfunction of the display panel if the heat is not effectively discharged.

As described above, embodiments relate to a window member configured to improve a heat discharge characteristic, and a display apparatus having the window member. A heat-discharge member of the window member may help discharge the heat generated from the display panel or the driver. Therefore, the heat-discharge characteristic of the display apparatus may be improved. In addition, when the heat-discharge member includes the graphite material or the graphene material with conductivity, the heat-discharge member may help to prevent accumulation of static electricity.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A window member, comprising:
   a base substrate that includes a display area transmitting a light and a non-display area disposed adjacent to the display area;
   a color pattern disposed on a surface of the base substrate in the non-display area; and
   a heat-discharge member that covers the color pattern and absorbs a heat to discharge the heat to an outside of the window member, wherein the color pattern is between the base substrate and the heat-discharge member.

2. The window member of claim 1, wherein the heat-discharge member includes a carbon material.

3. The window member of claim 2, wherein the heat-discharge member includes a graphene material and is extended in the display area.

4. The window member of claim 2, wherein the heat-discharge member includes a graphite material or a graphene material and is disposed on the color pattern.

5. The window member of claim 2, further comprising a first protective layer disposed between the color pattern and the heat-discharge member.

6. The window member of claim 5, further comprising a second protective layer disposed on the heat-discharge member.

7. The window member of claim 2, wherein the base substrate includes a concave portion disposed in the non-display area, and the color pattern is disposed in the concave portion.

8. A display apparatus, comprising:
a display panel for displaying an image;
a window member disposed in a direction in which a light exiting from the display panel travels; and
an adhesive layer disposed between the display panel and the window member, the window member including:
a base substrate that includes a display area transmitting a light and a non-display area disposed adjacent to the display area;
a color pattern disposed on a surface of the base substrate in the non-display area to face the display panel; and
a heat-discharge member that covers the color pattern and absorbs a heat to discharge the heat to an outside of the display apparatus, wherein
the color pattern is between the base substrate and the heat-discharge member.

9. The display apparatus of claim 8, wherein the heat-discharge member includes a carbon material.

10. The display apparatus of claim 9, wherein the heat-discharge member includes a graphene material and is extended in the display area.

11. The display apparatus of claim 9, wherein the heat-discharge member includes a graphite material or a graphene material and is disposed on the color pattern.

12. The display apparatus of claim 9, further comprising a first protective layer disposed between the color pattern and the heat-discharge member.

13. The display apparatus of claim 12, further comprising a second protective layer disposed on the heat-discharge member.

14. The display apparatus of claim 9, wherein the base substrate includes a concave portion disposed in the non-display area, and the color pattern is disposed in the concave portion.

* * * * *